Feb. 7, 1933. H. S. HELE-SHAW ET AL 1,896,978
CASTER
Filed May 14, 1931 3 Sheets-Sheet 2

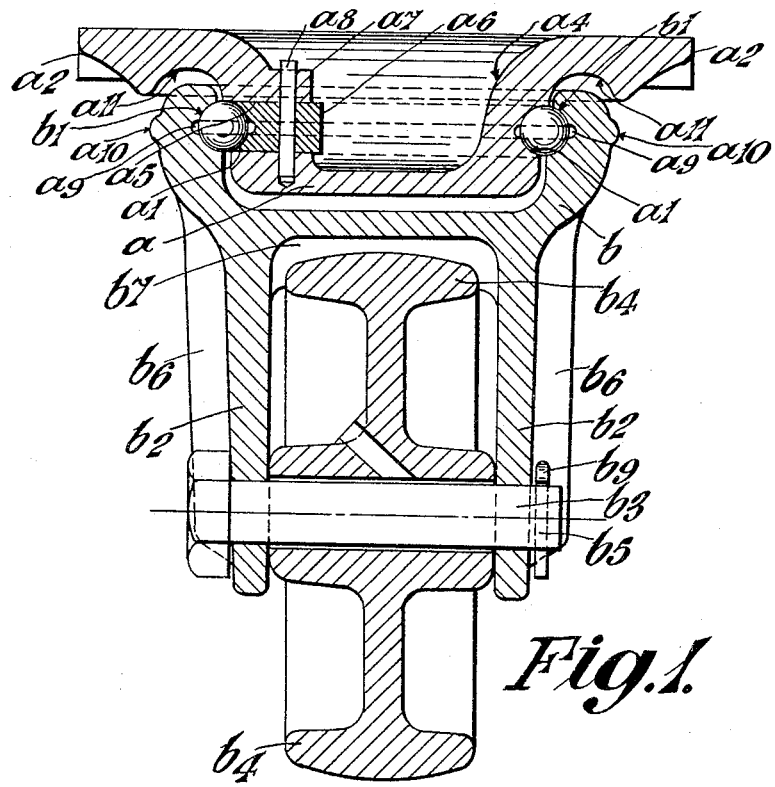
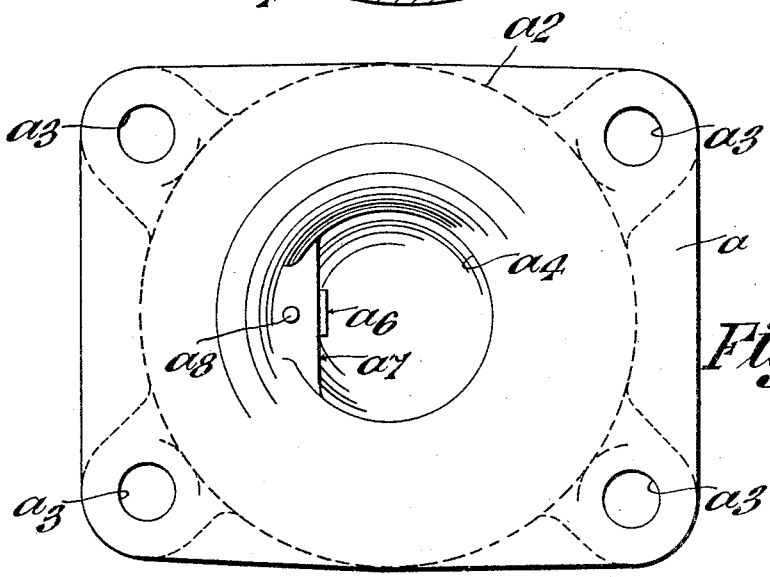

Patented Feb. 7, 1933

1,896,978

UNITED STATES PATENT OFFICE

HENRY SELBY HELE-SHAW AND THOMAS EDWARD BEACHAM, OF WESTMINSTER, LONDON, AND NORMAN ALBERT DAVIES, OF RADLETT, ENGLAND

CASTER

Application filed May 14, 1931, Serial No. 537,454, and in Great Britain June 4, 1930.

This invention relates to casters of the type having a ring of balls operating between two ball race surfaces of which the axis is substantially vertical. We have found that for the purpose of excluding dust and moisture from the ball race it is essential to provide the top or projecting portion of the caster with a ring or shroud fitting as closely as possible around the uppermost portion of the lower portion of the caster in such a manner that any deposit of moisture drips clear of the ball race and that the passage for the entrance of dust and dirt is small and sinuous, and that in order to effect this the latter portion of the caster must be made circular. In such a construction it is difficult to provide a boss to contain a pin closing the hole through which the balls are inserted: and such hole considerably weakens the structure, we therefore in accordance with the present invention provide the filling hole in the inner race.

It has also been found that the portion of the rotating race remote from the caster wheel is subject to tension and with cast races, that fractures are liable here when shock loads are encountered. Instead of thickening the whole race we prefer to thicken up only the portion remote from the wheel, and we prefer to thicken a portion of approximately one-third to one quarter of the circumference with the result that we obtain the maximum strength with the minimum weight. In machining the races we prefer to provide shallow grooves at the maximum diameter of the outer race and the minimum diameter of the inner race, in order that the balls may bed down into the grooves without affecting the axis about which they roll under the varying loads to which they are subject at various positions during the swivelling of the caster.

Figure 3:
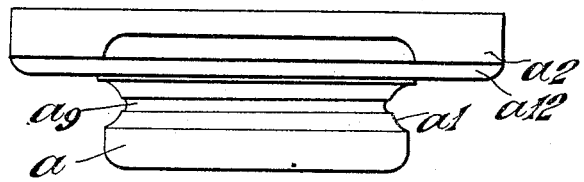
Figure 4:
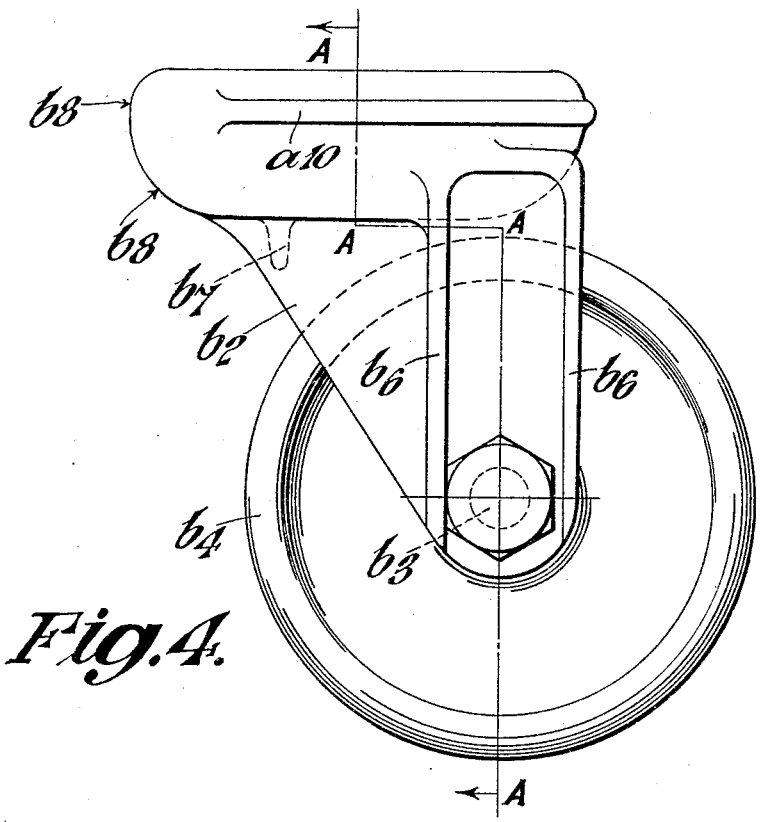
Figure 5:
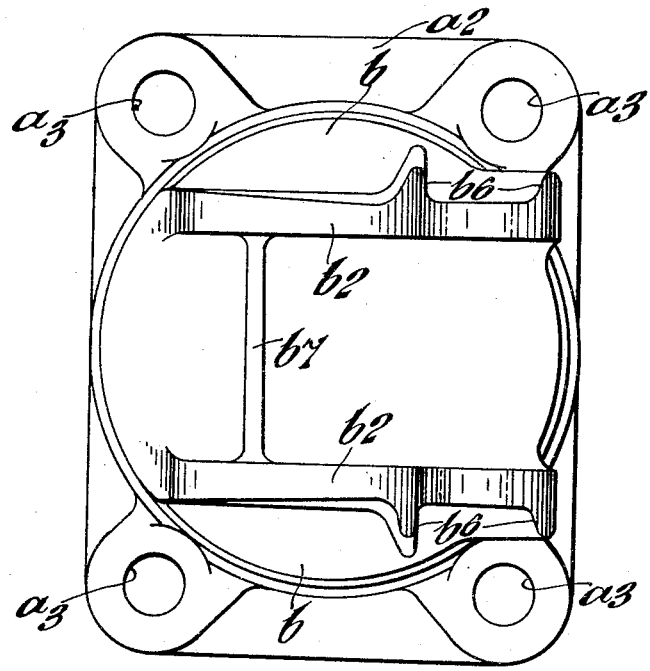
Figure 6:
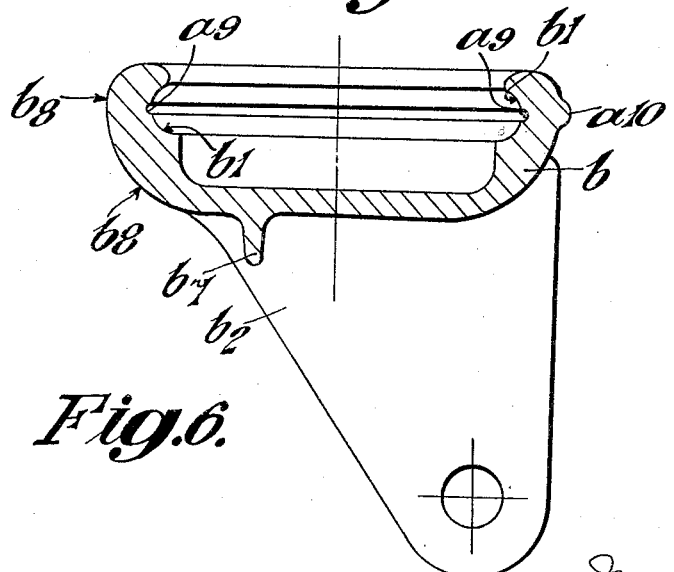

A manner of carrying out the invention is illustrated by the accompanying drawings wherein Figure 1 is a sectional elevation of the complete caster, Figure 2 is a plan of the top or fixing member of the caster, Figure 3 is an outside view of the top portion of the caster removed, Figure 4 is a similar view in side elevation of the lower portion of the caster, Figure 5 is an inverted plan of the caster with the wheel removed, and Figure 6 is a vertical section of the lower ball race.

In these drawings $a$ is the fixing portion of the caster with which the inner race $a1$ of the ball bearing is integral. The portion $a$ is provided with a fixing flange $a2$ having bolt or screw holes $a3$. The upper portion of $a$ is recessed at $a4$ to form a concavity and extending radially outwards from this recess into the ball race $a1$ is a hole $a5$ through which the balls of the ball bearing are inserted. Fitting accurately in the hole $a5$ is a plug $a6$ shaped at its end as a continuation of the bearing surface of the inner race $a1$. The inner end of the hole $a5$ is strengthened by a portion $a7$ and the plug $a6$ is held in place by a pin $a8$ passing vertically through a hole in $a7$ arranged to register when the plug $a6$ is in correct position with a hole drilled transversely through the plug $a6$, the pin $a8$ being screwed at its inner end into the part $a$ to prevent its accidental removal.

The lower or rotating portion of the caster comprises a casting $b$ in the upper portion of which is formed the outer ball race $b1$, and extending downwards from the ball race are two side cheeks $b2$ drilled to receive a pin $b3$ on which a wheel $b4$ rotates. The pin $b3$ may be held in position by a split pin $b9$ passed through the hole $b5$.

The side cheeks $b2$ are each strengthened by two vertical webs $b6$ and also by a depending web $b7$ extending horizontally between them.

The outer ball race $b1$ is at the portion remote from the caster wheel $b4$ thickened as shown at $b8$ where it will be in tension when the wheel $b4$ engages an obstruction. The thickening at $b8$ extends circumferentially in opposite directions so as to extend to approximately from one third to one quarter of the circumference of the race; and in the base of each ball race is provided a shallow groove $a9$ in order that the balls will bed down into the grooves of the races without affecting the axis about which they roll when under load when the caster is subjected to swivelling action. To compensate for the weakening of the caster by the shallow grooves a9 the outer portion of b is beaded at a10.

In the underside of the flange a2 is provided an annular groove a11 into which extends freely but with small clearance the upper edge of the external race b, so that there is formed a sinuous path from the outside of the caster to the balls and bearing surfaces thereby excluding dust and moisture, and at the outer edge if the groove a11 is formed a bead a12 from which moisture will drop clear of the bearing.

The pin a8 may be substituted by any other suitable device.

What we claim and desire to secure by Letters Patent is:—

1. A ball bearing caster comprising an inner ball race, an outer ball race, a caster fixing flange, a member carrying a roller, a non-rotatable detachable ball-retaining plug, and a vertically arranged plug fixing pin, the outer ball race being at the top of the member carrying the roller while the inner ball race is formed on the outside of the wall of a concavity formed in the fixing flange and having a horizontal hole extending from the hollow thereof to the base of the inner race and in which is fixed the detachable ball-retaining plug, the end of the ball-retaining plug being formed as a continuation of the inner race, and being held in such position by the plug fixing pin passing vertically through it and the surrounding metal of the caster fixing flange.

2. A ball bearing caster comprising an inner ball race, an outer ball race, a caster fixing flange, a member carrying a roller, a non-rotatable detachable ball-retaining plug, and a vertically arranged plug fixing pin, the outer ball race being at the top of the member carrying the roller and thickened at the portion of its periphery furthest away from the roller and opposite the ball race, while the inner ball race is formed on the outside of the wall of a concavity formed in the fixing flange and having a horizontal hole extending from the hollow thereof to the base of the inner race and in which is fixed the detachable ball-retaining plug, the end of the ball-retaining plug being formed as a continuation of the inner race, and being held in such position by passing vertically through it and the surrounding metal of the caster fixing flange.

3. A ball bearing caster comprising an inner ball race, an outer ball race, a caster fixing flange, a member carrying a roller, a non-rotatable detachable ball-retaining plug, and a vertically arranged plug fixing pin, the outer ball race being at the top of the member carrying the roller, and having an upwardly extending rim extending within a recess provided on the underside of the fixing flange while the inner ball race is formed on the outside of the wall of a concavity formed in the fixing flange and having a horizontal hole extending from the hollow thereof to the base of the inner race and in which is fixed the detachable ball-retaining plug, the end of the ball-retaining plug being formed as a continuation of the inner race and being held in such position by the plug fixing pin passing vertically through it and the surrounding metal of the caster fixing flange.

In witness whereof we affix our signatures.

HENRY SELBY HELE-SHAW.
THOMAS EDWARD BEACHAM.
NORMAN ALBERT DAVIES.